United States Patent [19]

Moos

[11] Patent Number: 4,502,546

[45] Date of Patent: Mar. 5, 1985

[54] WING BACK IMPLEMENT

[75] Inventor: Niklaus J. Moos, Lethbridge, Canada

[73] Assignee: Versatile Corporation, Vancouver, Canada

[21] Appl. No.: 535,534

[22] Filed: Sep. 26, 1983

Related U.S. Application Data

[63] Continuation of Ser. No. 311,011, Oct. 3, 1981, abandoned.

[51] Int. Cl.³ ............................................. A01B 73/00
[52] U.S. Cl. ................................... 172/311; 172/690; 280/411 A
[58] Field of Search ............... 172/311, 413, 456, 446, 172/652, 662, 690; 56/6, 7, 228, 385; 280/411 R, 411 A, 411 B, 411 C, 412, 413, 656

[56] References Cited

U.S. PATENT DOCUMENTS

| | | | |
|---|---|---|---|
| 414,896 | 11/1889 | Beard | 172/690 X |
| 2,901,268 | 12/1959 | Christensen | 172/456 X |
| 3,654,999 | 4/1972 | Fischer | 172/311 |
| 3,960,221 | 6/1976 | Blair et al. | 172/311 |
| 4,211,287 | 7/1980 | Garrison | 172/311 |
| 4,306,732 | 12/1981 | Pettibone | 172/413 X |
| 4,355,689 | 10/1982 | Friggstad | 172/311 |

FOREIGN PATENT DOCUMENTS

| | | | |
|---|---|---|---|
| 1041825 | 11/1978 | Canada | 172/311 |
| 698567 | 11/1979 | U.S.S.R. | 172/311 |

Primary Examiner—Richard T. Stouffer
Attorney, Agent, or Firm—Wenderoth, Lind & Ponack

[57] ABSTRACT

A rearwardly folding wing-back implement has a V-shaped frame configuration comprising two wing sections having the apex of the V-shape located at a pivot point where the wing sections are joined. A towing linkage minimizes the pulling forces being applied to the wing sections other than those pulling forces applied in the direction of movement of the implement. The implement may be pivoted rearwardly about the pivot point when transport is desired.

14 Claims, 8 Drawing Figures

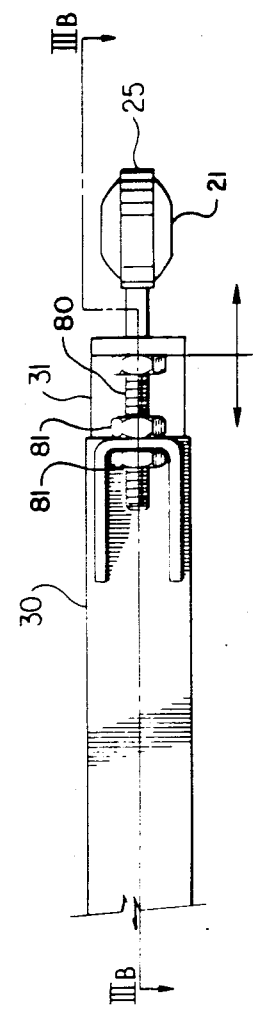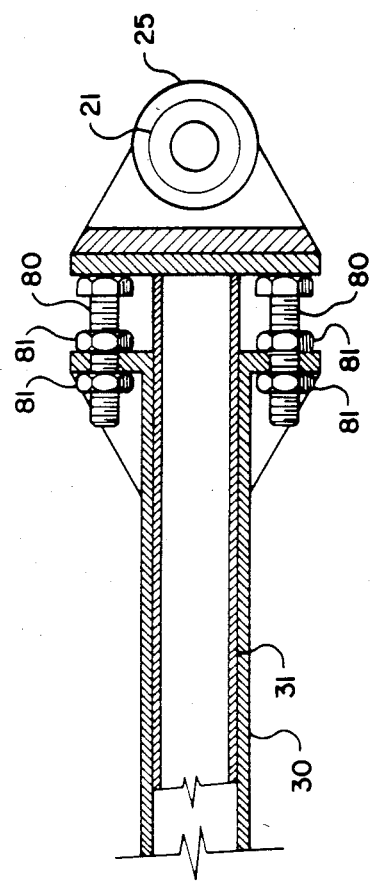
FIG. 3A
FIG. 3B

WING BACK IMPLEMENT

This application is a continuation of now abandoned Ser. No. 311,011 filed Oct. 13, 1981.

FIELD OF THE INVENTION

This invention relates to a rearwardly folding implement and, in particular, to a rearwardly folding implement with a single pivot axis about which the implement is folded.

BACKGROUND OF THE INVENTION

The disadvantages caused by the continuously increasing transverse width of farm implements as farm operations continue to grow larger are well known. Transportation of the implements over public roadways between fields where it is desired to operate the implement is a central disadvantage. Many solutions to the problem have been proposed, all of which, however, have certain inherent disadvantages.

In one well known and used technique, the implement is disconnected from the tractor when one field operation is finished and re-connected to the tractor by one end of the implement. This results in a narrower transverse width for transportation but it is inconvenient for the tractor operator and may result in exceeding the legally permissible transport width may due to the implement configuration. The length of the implement may also be too long to move conveniently.

In another technique, the end sections of the implement may be "winged-up". This results in a narrower transverse width without the operator inconvenience inherent in end transport but it frequently results in unsafe conditions where the ground working tools may be exposed. Height limitations also become of concern when "winging-up" the implement. In any event the transverse width of the implement may still be of concern.

More recently, it has been proposed to "wing-back" the implement. "Winging-back" an implement is an improved technique since when an implement is "winged back", the transverse width and height of the implement are not normally problems. This technique also overcomes the danger of ground tool exposure which may be caused in the "wing-up" process.

When utilizing the "wing-back" technique previously known, however, a centre section with two pivot points have been used. The use to connect the wings of such a centre section unnecessarily increases the transverse towing width of the implement.

SUMMARY OF THE INVENTION

Acccording to the invention, there is disclosed an agricultural implement to be towed by a tractor or the like, comprising:

a frame having wing sections connected at a pivot point, said wing sections each being comprised of a plurality of component sections hingedly connected to each other for pivoting movement about axes parallel to the direction of towing of said implement;

a towing linkage having rigid portions extending laterally of the longitudinal axis of said implement;

members connected between at least one of said plurality of component sections of said wing sections on opposite sides of said pivot point and said towing linkage, said members extending between said component section intermediate the ends thereof and said towing linkage in a direction substantially parallel to the direction of implement movement and said towing linkage being removable from said members, said wing sections being pivotable rearwardly about said pivot point upon removal of said towing linkage from the outboard ones of said members to bring the most outwardly distant portions of said wing sections into substantially adjacent transportable condition.

BRIEF DESCRIPTION OF THE SEVERAL VIEWS OF THE DRAWINGS

An embodiment of the invention will now be described, by way of example only, with reference to the accompanying drawings in which;

FIGS. 3A and 3B are detail and sectional views, respectively, of the area "III" shown in FIG. 2A;

DESCRIPTION OF SPECIFIC EMBODIMENT

Figure 1:
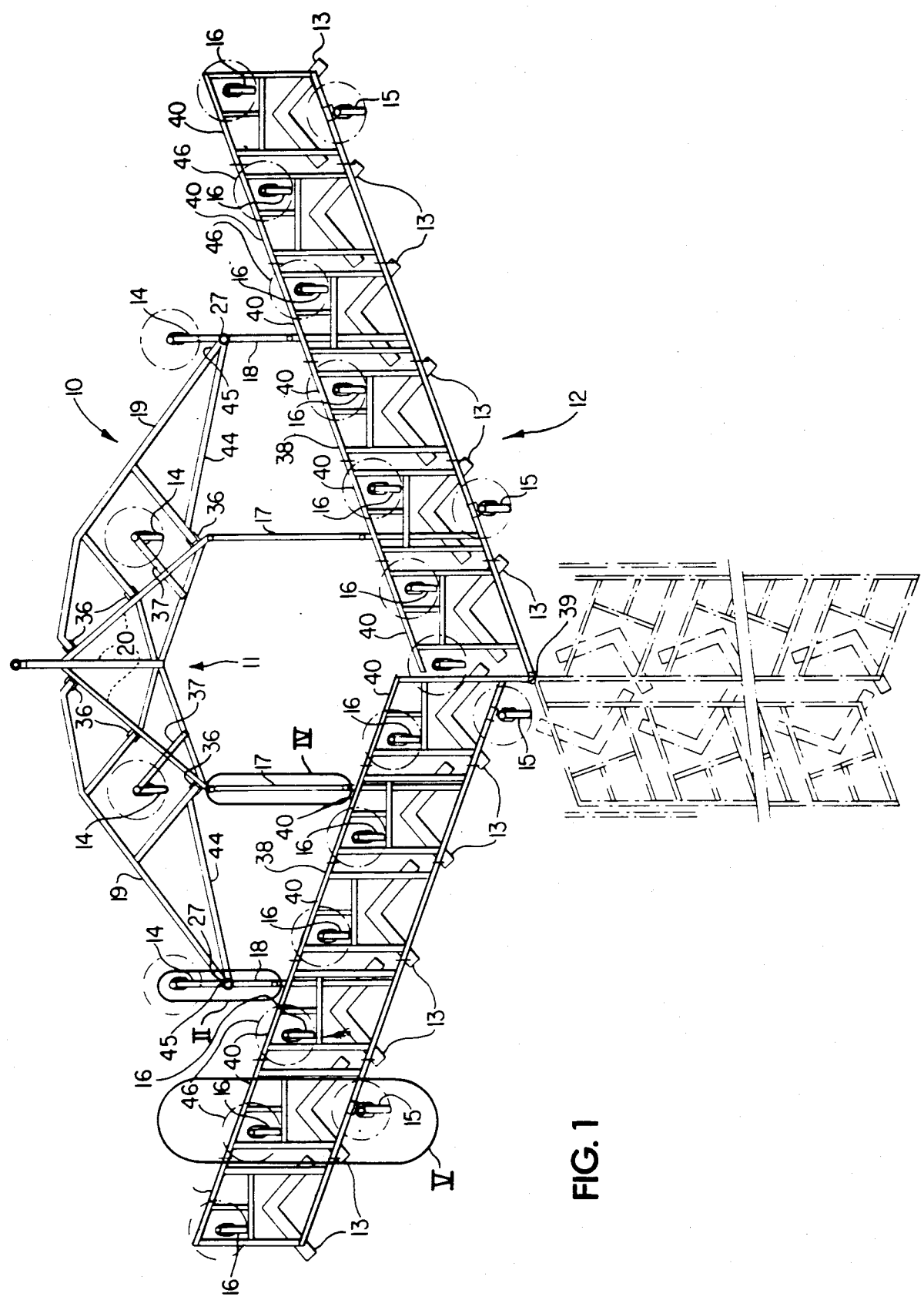
FIG. 1 is a plan view of a blade cultivator shown in its operating position with its transport condition shown in ghost.

A blade cultivator is shown generally at 10 and comprises a towing linkage 11, a frame 12, ground working tools or blades 13, gauge wheels 14, transport wheels 15 and depth control wheels 16.

Figure 2B:
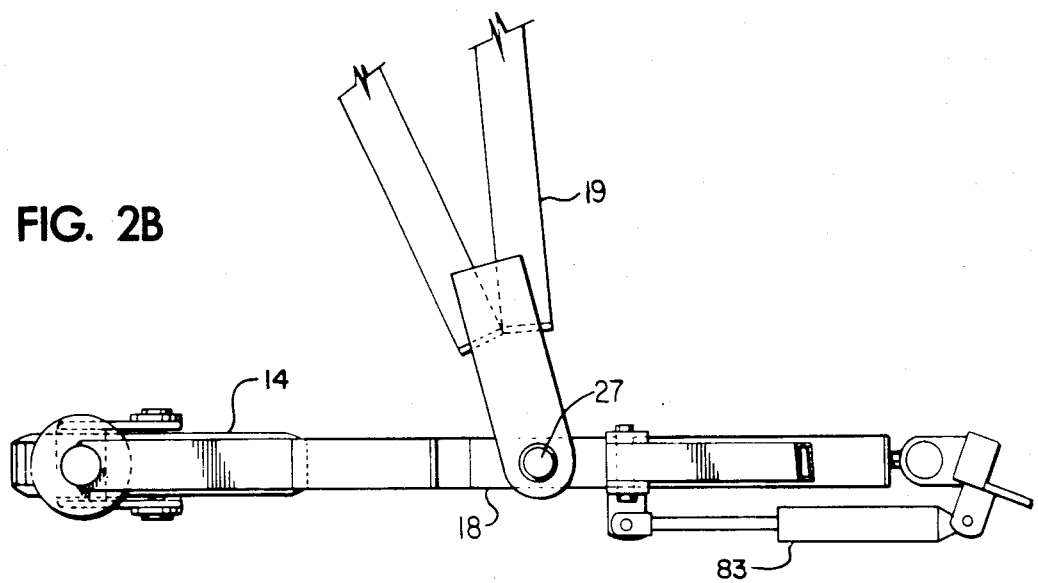
FIGS. 2A and 2B are enlarged side and plan views, respectively, of the area "II" shown in FIG. 1.
Figure 2A:
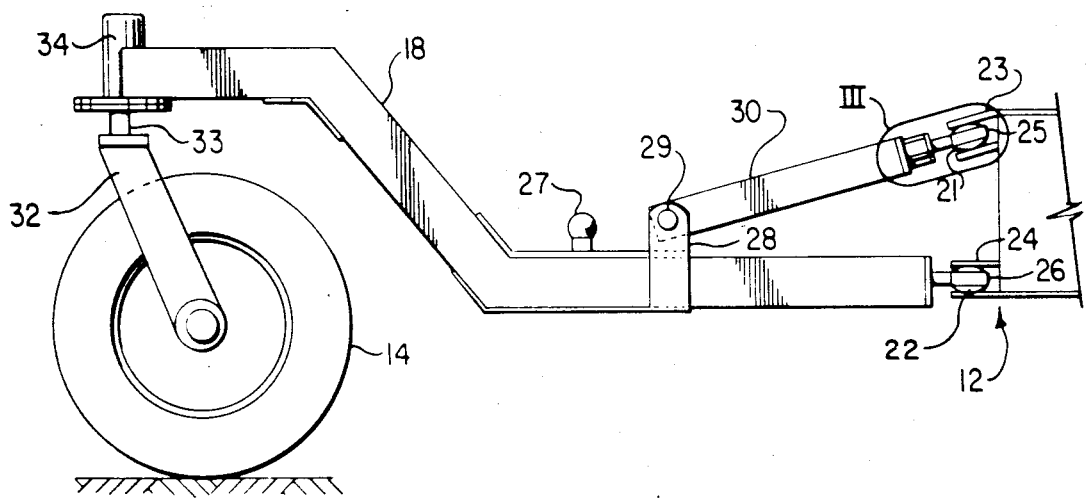

Towing linkage 11 comprises inner members 17, outer members 18, foldable reinforcing assemblies 19 and hitch member 20. Referring to FIG. 2A, outer member 18 comprises square tubing extending from the frame 12 to gauge wheels 14. At the end of member 18 adjacent frame 12, an upper bearing 21 and a lower bearing 22 are located and are secured within keepers 23, 24 welded to frame 12. Clevis 25, 26, respectively, surround the bearings 21, 22 and this combination allows movement of the member 18 in a plane parallel to the plane of the implement with the use of hydraulic cylinder 83 and in a plane transverse to the plane of the implement, although movement in this latter plane is restricted as will be hereafter noted.

Gauge wheel 14 is mounted to clevis 32 which, in turn, is mounted on shaft 33. Shaft 33 is allowed to freely rotate within bracket 34.

Pin 27 is connected to outer member 18 and allows foldable reinforcing assembly 19 to pass over its end when the implement is in operating position. Bracket 28 surrounds outer member 18 and acts to allow the insertion of a further pin 29 which is inserted through bracket 28 and compression tube 30. Referring now to FIGS. 3A and 3B, compression tube 30 allows telescopic tube 31 to be inserted therein. It will be seen that clevis 25 mounted on telescopic tube 31 will allow telescopic tube 31 to extend but will not allow compression past a distance determined by the adjustment of bolts 80 and nuts 81.

Figure 4:
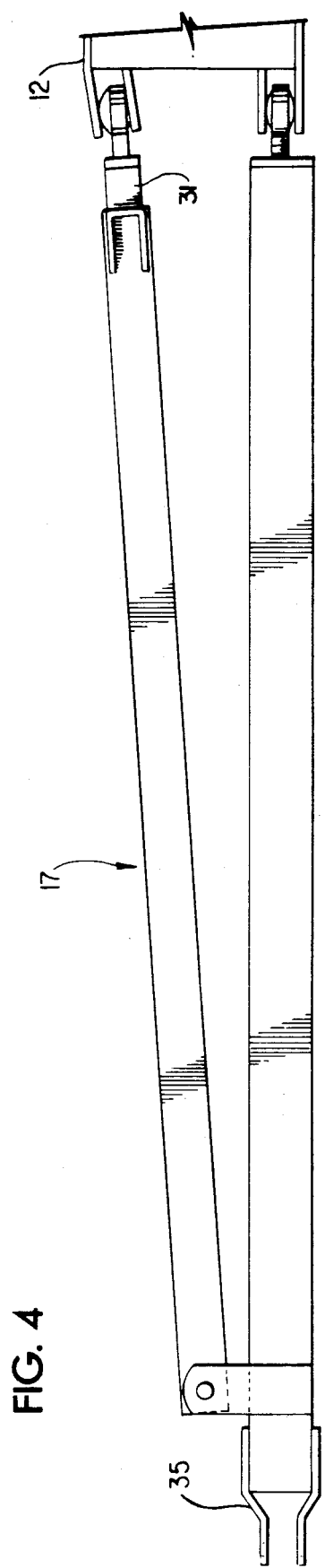
FIG. 4 is a detail side view of the area "IV" shown in FIG. 1.

Inner member 17 is shown in detail in FIG. 4. It is connected to the frame 12 through a clevis and ball joint substantially identical to that depicted in FIG. 2A and just described. Similarly, the telescopic tube 31 of the inner member 17 is substantially identical to the configuration shown in FIG. 3. A bracket 35 is welded to inner member 17 and this bracket, with a pin appropriately mounted, forms a pivotal connection with the hitch member 20.

Referring again to FIG. 1, the hitch member 20 comprises cross members 44 and three brackets 36 mounted to each side. Each bracket 36 is adapted to accommodate one end of each respective leg of the foldable reinforcing assembly 19 and to allow each such end of the leg to rotate within it. Gauge wheels 14 are mounted to the ends of gauge wheel members 37 which, in turn, are connected to hitch member 20.

Foldable reinforcing assemblies 19 are mounted with brackets 36 and can be moved for relative rotational movement therein. Accordingly, the ends 45 of foldable reinforcing assembly 19 can be removed from pins 27 and folded upwardly about the axis of brackets 36.

Figure 5A:
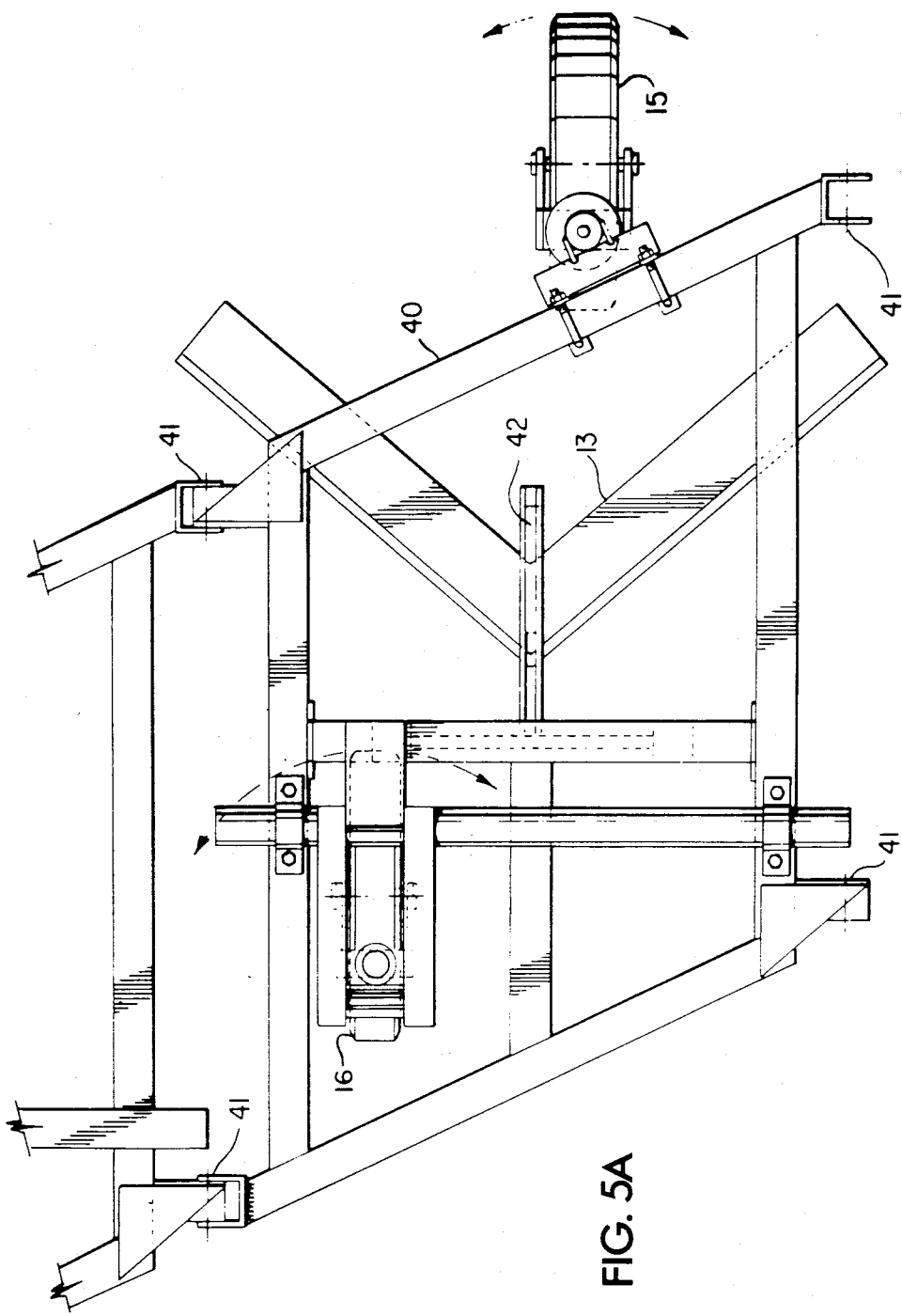
FIGS. 5A and 5B are enlarged plan and side views, respectively, of a section of the wingback implement area shown as "V" in FIG. 1.

The frame 12 comprises two wings 38 which extend outwardly and forwardly from pivot point 39 and from the longitudinal axis of the frame. Each wing comprises six sections 40. A typical section 40 showing the transport and field positions of the transport and depth control wheels 15, 16, respectively, is depicted in more detail in FIGS. 5A and 5B.

Figure 5B:
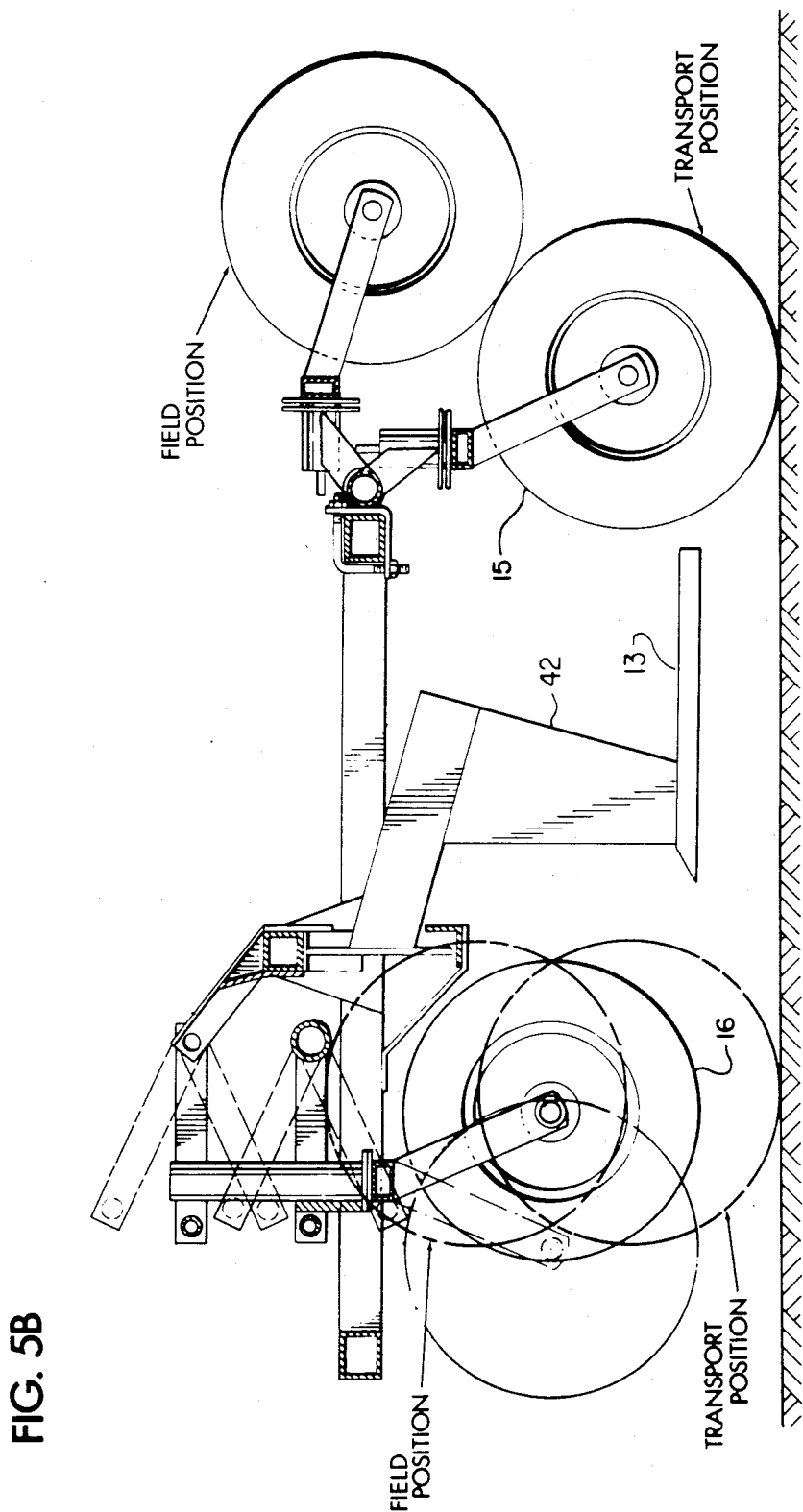

The section 40 is hingedly connected to each adjacent frame section at connections 41 as is known. A blade 13 mounted to a shank 42 is mounted to the underside of each section 40 as is a depth control wheel 16. As shown in FIG. 5B, depth control wheel 16 may be vertically adjusted to adjust the working depth of the blades 13.

A transport wheel 15 is mounted to each of four of the sections 40. As shown in FIG. 5B the transport wheel 15 may be moved upwardly or downwardly utilizing a hydraulic cylinder (not shown). The field and transport positions are depicted in FIG. 5B.

The gauge wheels 14, transport wheels 15 and depth control wheels 16 are all castoring type wheels with the exception of the four fixed depth control wheels 46. These four wheels 46 are always locked in one of two 110° opposed positions, the first position being used when the implement is operated and the second position being used when the implement is transported.

OPERATION

It will be assumed the implement is as shown in FIG. 1 and the operator desires to transport and utilize the implement in an adjacent field.

Hydraulic cylinders (not shown) connected to the depth control wheels 16 and transport wheels 15 are operated and the blades 13 are thereby removed from the ground as seen in FIG. 3B in the "transport" position. The operator then moves the towing vehicle or tractor rearwardly a distance sufficient to loosen the pulling force on the various joints and connections of the implement. Hydraulic cylinders (not shown) are mounted to move foldable reinforcing assemblies 19 upwardly and out of contact with pins 27. Hydraulic cylinders 83 are attached to outer members 18 and they act to move them and their attached gauge wheels 14 against the wings 38 of the implement.

The operator then moves the towing vehicle or tractor slowly ahead and, as he so moves, the implement folds or "wings-back" about pivot point or pin 39 until each wing 38 has substantially reached the transport position shown in ghost in FIG. 1. Hydraulic assist units (not shown) may be used, if necessary, when the implement is being "winged back". The wings 38 may then be locked together by a locking means (not shown) in the transport position.

The fixed depth control wheels 46 are locked in a position such that they will allow straight ahead implement movement. The implement is thereby ready for towing.

When the operator reaches the desired working location, he reverses the above procedure. The locking means is released and the towing vehicle or tractor is moved slowly rearwardly until the wings 38 are substantially in the operating position. The outer members 18 are moved outwardly from the implement by hydraulic cylinders 83 and the foldable reinforcing assemblies 19 are moved downwardly over pins 27. As shown in FIG. 3B, depth control wheels 16 are vertically adjusted, if necessary, to obtain the correct depth for the blade 13. Similarly, transport wheels 15 are rotated upwardly about axis 43 until they are removed from ground contact. Gauge wheels 14 are adjusted to maintain the implement in level operating position by moving bolt 80 in and out of compression tube 30 with the use of nuts 81. The implement is then ready for operation.

Many modifications may be made to the implement disclosed. For example, when it is desired to fold an implement using ground working tools of lesser width than those of blades, the pivot point 39 may be located in a position such that the implement is substantially symmetrical about that axis because there will not exist the problem of blade interference when the implement is folded. Similarly, although the use of hydraulic cylinders has been disclosed, it is apparent that many of the operations carried out by the operation of these cylinders may be done manually.

Accordingly, although these modifications and many others may be made, they will not depart from the scope of the invention which should, therefore, be limited by reference to the accompanying claims.

I claim:

1. An agricultural implement to be towed by a tractor or the like, comprising:
    a frame having wing sections connected at a pivot point, said wing sections each being comprised of a plurality of component sections hingedly connected to each other for pivoting movement about axes parallel to the direction of towing of said implement;
    a towing linkage having rigid portions extending laterally of the longitudinal axis of said implement said longitudinal axis being parallel to said direction of towing;
    members connected between at least one of said plurality of component sections of said wing sections on opposite sides of said pivot point and said towing linkage, said members extending between said at least one of said component sections intermediate the ends thereof and said towing linkage in a direction substantially parallel to the direction of implement towing and said towing linkage being removable from said members, said wing sections being pivotable rearwardly about said pivot point upon removal of said towing linkage from the outboard ones of said members to bring the most outwardly distant portions of said wing sections into substantially adjacent transportable condition.

2. An agricultural implement as in claim 1 wherein said wing sections have a substantially rearwardly directed "V" shaped working configuration having its apex substantially at said pivot point.

3. An agricultural implement as in claim 2 and further comprising ground working tools connected to each of said wing sections, each of said ground working tools being located forwardly of its inwardly adjacent ground working tool.

4. An agricultural implement as in claim 3 wherein an equal number of ground working tools are located on each of said wing sections.

5. An agricultural implement as in claim 4 wherein one pair of two members are attached to each of said wing sections, each of said pairs having an inner and outer member.

6. An agricultural implement as in claim 5 wherein the end of each of said inner members opposed from said wing sections is pivotably connected to said towing linkage.

7. An agricultural implement as in claim 6 wherein the intermediate portion of each of said outer members is removably connected to said towing linkage.

8. An agricultural implement as in claim 7 wherein each of said wing sections comprises a plurality of individual component sections, each of said component sections being hingedly connected to adjacent component sections, said ground working tools being mounted on said component sections.

9. An agricultural implement in claim 8 wherein said foldable reinforcing assemblies are rotatable about brackets located on said towing linkage.

10. An agricultural implement as in claim 9 and further comprising a gauge wheel connected to the end of each of said outer members opposed from said wing sections.

11. An agricultural implement as in claim 10 and further comprising depth control wheels connected to each of said component sections.

12. An agricultural implement as in claim 11 and further comprising transport wheels, connected to each of the rearward and outboard portion of said wing sections and to the rearward and inward portions of said wing sections adjacent said pivot point.

13. An agricultural implement as in claim 7 wherein said towing linkage comprises respectively opposed foldable reinforcing assemblies, each of said assemblies being connected to one of said outer members.

14. An agricultural implement to be towed by a tractor or the like and operable to fold about a pivot point comprising:
   a frame having wing sections joined at said pivot point and extending outwardly and forwardly therefrom in a generally symmetrical configuration, said wing sections being comprised of a plurality of component sections hingedly connected to each for pivoting movement about axes parallel to the direction of towing of said implement;
   a towing linkage having rigid portions extending laterally of the longitudinal axis of said implement, said longitudinal axis being parallel to said direction of towing;
   members between said towing linkage and at least one of said plurality of component sections of said wing sections, said members extending from said component section intermediate the ends thereof to said towing linkage in a direction substantially parallel to the direction of towing of said implement;
   depth control, transport and gauge wheels, and ground working tools connected to said frame, said gauge wheels being mounted on the outwardmost members on the ends opposed to said frame and said depth control wheels being mounted on said wing sections forwardly of said ground working tools and operable to support said wing sections when in transport, said transport wheels being mounted on each of said wing sections rearwardly of said respective ground working tools and operable to provide support for said wing sections when in transport.

* * * * *